United States Patent [19]
Doron et al.

[11] Patent Number: 6,157,461
[45] Date of Patent: Dec. 5, 2000

[54] METHOD OF GENERATING RANDOMIZED MASKS TO IMPROVE IMAGE QUALITY ON A PRINTING MEDIUM

[75] Inventors: Amir Doron; Ronald A. Askeland; Michael M. Chang, all of San Diego, Calif.

[73] Assignee: Hewlett-Packard Company, Palo Alto, Calif.

[21] Appl. No.: 08/957,853

[22] Filed: Oct. 27, 1997

[51] Int. Cl.[7] ................................................. G06F 15/00
[52] U.S. Cl. ........................... 358/1.9; 358/1.8; 358/517; 347/12; 347/15
[58] Field of Search .................................... 395/101, 102, 395/104, 108, 112, 109; 347/15, 40, 43, 16, 174, 12, 17, 19; 358/296, 502, 517, 1.1, 1.2, 1.4, 1.8, 1.9, 1.13, 535, 536

[56] References Cited

U.S. PATENT DOCUMENTS

| | | | |
|---|---|---|---|
| 4,748,453 | 5/1988 | Lin et al. | 346/1.1 |
| 4,963,882 | 10/1990 | Hickman | 346/1.1 |
| 4,965,593 | 10/1990 | Hickman | 346/140 R |
| 4,967,203 | 10/1990 | Doan et al. | 346/1.1 |
| 4,975,780 | 12/1990 | Kuboki | 358/296 |
| 5,070,345 | 12/1991 | Lahut et al. | 346/1.1 |
| 5,079,571 | 1/1992 | Eirksen | 346/140 R |
| 5,239,312 | 8/1993 | Merna et al. | 346/1.1 |
| 5,430,469 | 7/1995 | Shioya et al. | 347/15 |
| 5,555,006 | 9/1996 | Cleveland et al. | 347/41 |
| 5,818,474 | 10/1998 | Takahashi et al. | 347/15 |
| 5,923,349 | 7/1999 | Meyer | 347/43 |

FOREIGN PATENT DOCUMENTS

| | | | |
|---|---|---|---|
| 2070355 | 12/1992 | Canada | B41J 2/205 |
| 0300743 | 1/1989 | European Pat. Off. | B41J 3/04 |
| 0420399 | 4/1991 | European Pat. Off. | B41J 2/21 |
| 0471488 | 2/1992 | European Pat. Off. | B41J 2/21 |
| 0517519 | 12/1992 | European Pat. Off. | B41J 2/205 |
| 0517520 | 12/1992 | European Pat. Off. | B41J 2/205 |
| 0632405A2 | 1/1995 | European Pat. Off. | G06K 15/10 |
| 0738068A2 | 10/1996 | European Pat. Off. | H04N 1/034 |
| 0745484A1 | 12/1996 | European Pat. Off. | B41J 2/21 |
| 0863478A | 9/1998 | European Pat. Off. | G06K 15/10 |
| 3251468 | 11/1991 | Japan | B41J 2/525 |
| 4-361049 | 12/1992 | Japan | B41J 2/205 |
| 4-366645 | 12/1992 | Japan | B41J 2/205 |

*Primary Examiner*—Edward L. Coles
*Assistant Examiner*—Mark Wallerson
*Attorney, Agent, or Firm*—Jerry R. Potts

[57] ABSTRACT

A mask generation subroutine forms Z number of stacked n by m blank mask matrix arrays to provide a plurality of columnar mask locations. The subroutine then selects randomly any previously unselected column of mask locations from the stack of blank mask matrix arrays and assigns best print mode parameters to the individual mask locations in the selected column. The process of selecting and assigning is repeated until all columns of mask locations have been selected and all mask locations have been assigned best print mode parameters to provide a complete set of Z number of configured mask matrix arrays. A control program selects desired ones of the Z number of masks and applies the selected mask to control indicia patterns so that the depositing of indicia forming material in adjacent pixel locations is spaced in time to occur in different ones of the Z passes.

32 Claims, 6 Drawing Sheets

METHOD OF GENERATING RANDOMIZED MASKS TO IMPROVE IMAGE QUALITY ON A PRINTING MEDIUM

TECHNICAL FIELD

This invention relates to masking methods for multi-pass computer printers and more particularly, to a masking method for facilitating the depositing of an indicia forming material onto a print medium without creating any substantially observable artifacts.

BACKGROUND OF THE INVENTION

Computer printers are efficient, quiet and produce high quality printed images in a relatively inexpensive manner when operated in low speed printing modes. Image quality is achieved by sweeping indicia depositing apparatus over a print medium and depositing indicia forming material onto the medium in desired indicia patterns. The combined effect of sweeping, depositing and sequentially moving the medium through a predetermined print zone in a series of desired steps, enables the formation of a series of swaths that defined a desired image configured in an N by M image matrix array. The quality of the print image is then determined by applying the indicia forming material in a precise manner to the individual pixel locations on the print medium without any substantial coalescence.

While such low speed printers have been satisfactory for many applications, there has been a constant demand for printers to produce higher quality photo-like full color images. Meeting the demand for producing photo quality, high color density images however, has not been achieved easily. In this regard, in order to produce full vibrant colors on a print medium, large volumes of indicia forming material must be deposited in concentrated areas on the medium. While depositing large volumes of indicia forming material on a print medium produces vibrant colors, such large deposits in adjacent pixel locations often results in some form of coalescence or observable artifacts.

One common form of indicia forming material utilized in modern day computer printers, such as inkjet printers, is ink carried in a water based media. The water based ink solution permits the deposit of large volumes of ink in a fast and efficient manner. The quality of the ink patterns formed on the print medium is then highly dependent upon the volume of the individual ink droplets and the accuracy in their placement on the medium pixel locations.

While inkjet printers produce high quality photo-like images, it is well known to those skilled in the art, that droplet size and placement accuracy degrade with time due to mechanical and electrical fatigue factors associated with the print head nozzles of such printers. Such nozzle fatigue factors generally manifest in pattern-like printing errors that are quite noticeable to a user particularly when printing in a single pass printing mode.

In order to help extend the useful life of such print heads, many inkjet printers have employed what is known as a multi-pass print mode of operation that facilitates the hiding of individual nozzle failures. For example as a comparison, in a single pass mode, should a given nozzle not fire perfectly, be misdirected, or clog and fail, the degradation in print quality will be seen in each row of the image printed by the defective nozzle. On the other hand, in a multi-pass print mode of operation each row is printed by two or more nozzles. In this manner, for example, in a four pass print mode printer only one out of four ink droplets may be missing or misdirected resulting in a much less catastrophic result. While multi-pass printing has helped improve image quality, the improvement has been at the expense of throughput.

One attempt at helping to improve throughput while simultaneously addressing the problems associated with coalescence as well as bleeding and beading of ink droplets between adjacent pixel locations, is disclosed in U.S. Pat. No. 4,748,453. In this regard, there is taught an ink jet printing method for depositing drops of ink in a checkerboard pattern through the use of a mask. The use of the mask assures that there is no overlap of ink spots from adjacent pixel areas when the ink is still in a flowable state. While the dividing the ink drop deposits into separate and distinct complementary areas has improved the problems associated with coalescence, such masking techniques have not entirely solved the problems associated with coalescence since ink deposits between diagonally oriented pixel locations still exhibit coalescence. Moreover, the use of small masks, such as 2×2 masks and 4×4 masks, produce artifacts as the fixed mask configuration is applied in a highly repetitive manner. For example, a 2×2 mask is typically applied every two pixels causing a repetitive pattern to be stamped out every two pixels in both the horizontal and vertical directions and especially in the horizontal direction. Such a repetitive pattern becomes visible to a user when the nozzles do not fire perfectly, are misdirected, mis-aligned or clogged. In this regard, as a defective nozzle sweeps across a print medium, the resulting swath will exhibit the same dot absence or misplacement for every pixel produced from the defective nozzle.

Another attempt at solving the problems associated with coalescence between diagonally adjacent pixel locations is disclosed in U.S. Pat. No. 4,965,593 known as the Hickman patent. The Hickman patent teaches separating the ink drop deposits in every direction, in each pass, by leaving one blank pixel in the pixel grid spacings. While this technique solves the coalescence problem associated with diagonally adjacent pixel locations, the resulting inability to print on the spaced apart pixel locations has proven to be less than desirable.

Thus, while the use of a multi-pass print mode in combination with a mask has been successful in some applications, this technique has not been entirely satisfactory. Therefore it would be highly desirable to have a new and improved printer and masking method for depositing ink droplets onto a print medium that substantially eliminates or at least that greatly reduces the depositing of indicia forming material in adjacent pixel locations while simultaneously helping to substantially eliminate or at least greatly reduce unwanted and undesired artifacts caused by the repeated application of a fixed mask matrix array.

DISCLOSURE OF INVENTION

The present invention relates to a novel method of printing images on a print medium using a computer printer. The novel method of printing images includes generating a mask set having randomly determined best print mode parameters. The mask sets when applied, to image data to be printed, substantially eliminate or at least greatly reduce repetitive mask patterns or artifacts. In short, the inventive method assures excellent print quality, and minimizes the observable effects of clogging and misalignment associated with indicia depositing apparatus fatigue factors.

In accordance with one aspect of the invention, a mask generation subroutine forms Z number of stacked n by m blank mask matrix arrays to provide a plurality of columnar mask locations. The mask forming subroutine then selects randomly any previously unselected column of mask locations from the stack of blank mask matrix arrays and assigns best print mode parameters to the individual mask locations in the selected column. The process of selecting and assigning is repeated until all columns of mask locations in the stacked arrangement have been selected and all mask locations within the selected columns have been assigned best print mode parameters. In this manner, a complete set of Z number of configured mask matrix arrays are generated and configured to be subsequently applied to image data to be printed. Since different configured masks are generated for each printing operation, repetitive patterns or artifacts are not seen in resulting text and object images formed on a printing medium during the printing operations.

In accordance with another aspect of the present invention, a control program selects desired ones of Z number of randomly generated masks and applies the selected masks to image data to be printed. In this manner, is the selected masks control indicia patterns so that the depositing of indicia forming material in adjacent pixel locations is spaced in time to occur in different passes in a multi-pass printing operation.

In accordance with another aspect of the invention, a computer printer stores data indicative of an image to be printed on a printing medium in an image matrix array of N by M pixel locations. A mask forming algorithm determines the number of passes in a current print mode and then forms a given number of stacked blank mask matrix array planes corresponding to the determined number of passes. Each mask plane is arranged in a large n by m matrix array of mask locations, where each location has an assigned best print mode parameter determined via a rule-based algorithm.

The rule-based algorithm selects randomly an individual one of the mask locations in the stacked matrix array and then generates best print mode parameters for each of the selected locations, which parameters are assigned to each of the corresponding locations of each mask. The random selection, parameter generation, and assignment to corresponding locations is repeated a sufficient number of times to completely configure the determined number of mask planes which a complete set of best print mode parameters.

According to another aspect of the present invention, the rule-based algorithm facilitates the determination of the best printing pass for the application of each mask location to the image data to be printed. In this regard, the algorithm examines the mask locations in the adjacent neighborhood of each selected location to determine if adjacent locations are free or open of a previously assigned weighted or best print mode parameter number that would result in one or more droplets of ink being placed next to each other on the printing medium. When open or unassigned locations are determined in the neighborhood of the selected mask location, the selected mask location is assigned a higher parameter number. This process is repeated relative to horizontally adjacent locations, vertically adjacent locations, and diagonally adjacent locations. The selected mask location is assigned a lower parameter number as the neighborhood boundaries expand outwardly where lesser parameter values are assigned progressively for the additional spacing between the selected mask location and the next free adjacent mask location.

In still yet another aspect of the present invention, due to the wrap-around property of mask matrix array patterns, the neighborhood wraps around as well, so the left most location in a formed mask will have the rightmost elements in its corresponding left neighbor.

BRIEF DESCRIPTION OF DRAWINGS

The above mentioned features of this invention and the manner of attaining them will become apparent, and the invention itself will be best understood by reference to the following description of the embodiment of the invention in conjunction with the accompanying drawings, wherein.

DESCRIPTION OF THE PREFERRED EMBODIMENT

According to a first embodiment of the present invention, a mask generation subroutine 400 (FIG. 4B) determines the number of passes in a current print mode of a multi-pass computer printer 10, and then forms a like number of stacked mask planes. Each mask plane is arranged in an n by m matrix array of mask locations, where each location is assigned a best print mode or printing mask parameter determined via the subroutine 400. In this regard, the mask generation subroutine 400 selects randomly is an individual one of the mask locations in the stacked matrix array and then generates, via a rule-based algorithm, best print mode parameters for the selected location. The determined parameters are then assigned, via the subroutine 400, to each of the mask locations in the selected. The random selection, parameter generation, and assignment to corresponding mask locations in the selected column is repeated a sufficient number of times to completely configure the determined number of mask planes with a complete set of best print mode parameters.

Figure 7:
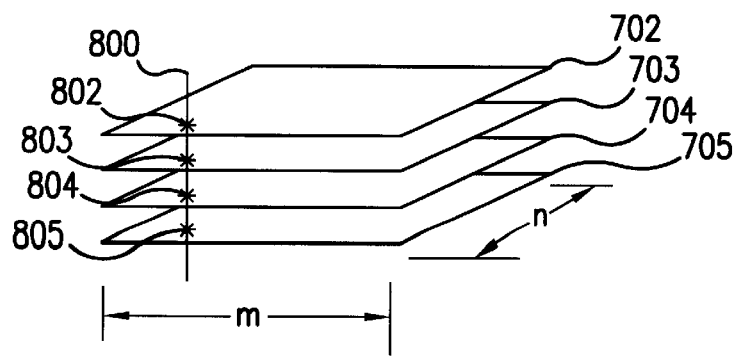
FIG. 7 is a diagrammatic illustration of a plurality of stacked masks.

From a conceptual point of view as best seen in FIG. 7, the mask generation subroutine 400, considers the individual mask planes, such as the mask planes 702–705 to be configured in a stacked arrangement. Each of the individual mask planes 702–705 in the stacked group correspond to individual one of the printing passes in the multi-pass printer 10. The subroutine 400 then randomly picks a first mask location in the top most mask, such as the mask 702 and look downwardly into the stack along a columnar axis, such as the axis 800, to see a column of mask locations, such as the mask locations 802–805. Using the rule-based algorithm, the subroutine 400 determines the best print mode parameter for each of the mask locations 802–805 disposed on the common axis 800 with a view toward neighbor groups. The determined best mode printing parameters are then assigned to their respective mask locations 802–805 via the subroutine 400. The above described sequence of selecting, determining and assigning is repeated a sufficient number of times so that each mask location in the stacked group of mask matrix arrays 702–705 is assigned a best print mode parameter.

Considering now the mask generation subroutine 400 in greater detail with reference to FIGS. 4B, 6A–C, and 7, the subroutine 400 is in the form of computer readable code that can be stored in any desired computer accessible medium. Such medium include internal and external computer memory units, and other types of computer accessible media, such as a compact disc readable by a storage device.

In operation, whenever a set of configured masks need to be generated for printing purposes, the mask generation subroutine 400 is executed, The subroutine 400 in general, forms Z number of stacked and aligned n by m blank mask matrix arrays, such as the matrix arrays 702–705 illustrated in FIG. 7. Each of the generated mask arrays are about 128 locations by about 16 locations. A most preferred sized matrix array is about 128 locations by about 32 locations. As each of the generated masks 702–705 are aligned with one another in a stacked arrangement, the stacked configuration provides a plurality of aligned columnar mask locations, such as the individual locations 802–805.

The subroutine 400 then randomly selects any previously unselected column of mask locations from the stack, for example, such as the mask locations disposed along column 800 illustrated in FIG. 7. Utilizing a rule-based algorithm, that will be described hereinafter in greater detail, the subroutine 400 then assigns the individual mask locations in the selected column with best print mode parameters.

This process of selecting, determining and assigning is repeated by the subroutine 400 until all columns have been selected and all mask locations in the stacked arrangement have been assigned mask parameters. In this manner a complete set of Z number of configured mask matrix arrays are generated.

According to a second embodiment of the present invention, a mask application or control algorithm 100 (FIG. 4A) causes a stored group of randomly generated masks to be selectively retrieved and repeatedly individually applied to groups of pixel values in each swath of image information to be printed. As will be explained hereinafter in greater detail, the control algorithm 100 substantially eliminates or at least greatly reduces unwanted and undesired artifacts that would other be made visible in the swath of image information through repeatedly applying n by m mask arrays to the image information to be printed in an N by M image matrix array of pixel locations. In this regard, different ones of the generated masks are applied relative to different portions of the image information to be printed to effectively breakup artifacts in the horizontal, vertical and diagonal directions associated with adjacent pixel locations in the N by M image matrix array.

Figure 1:
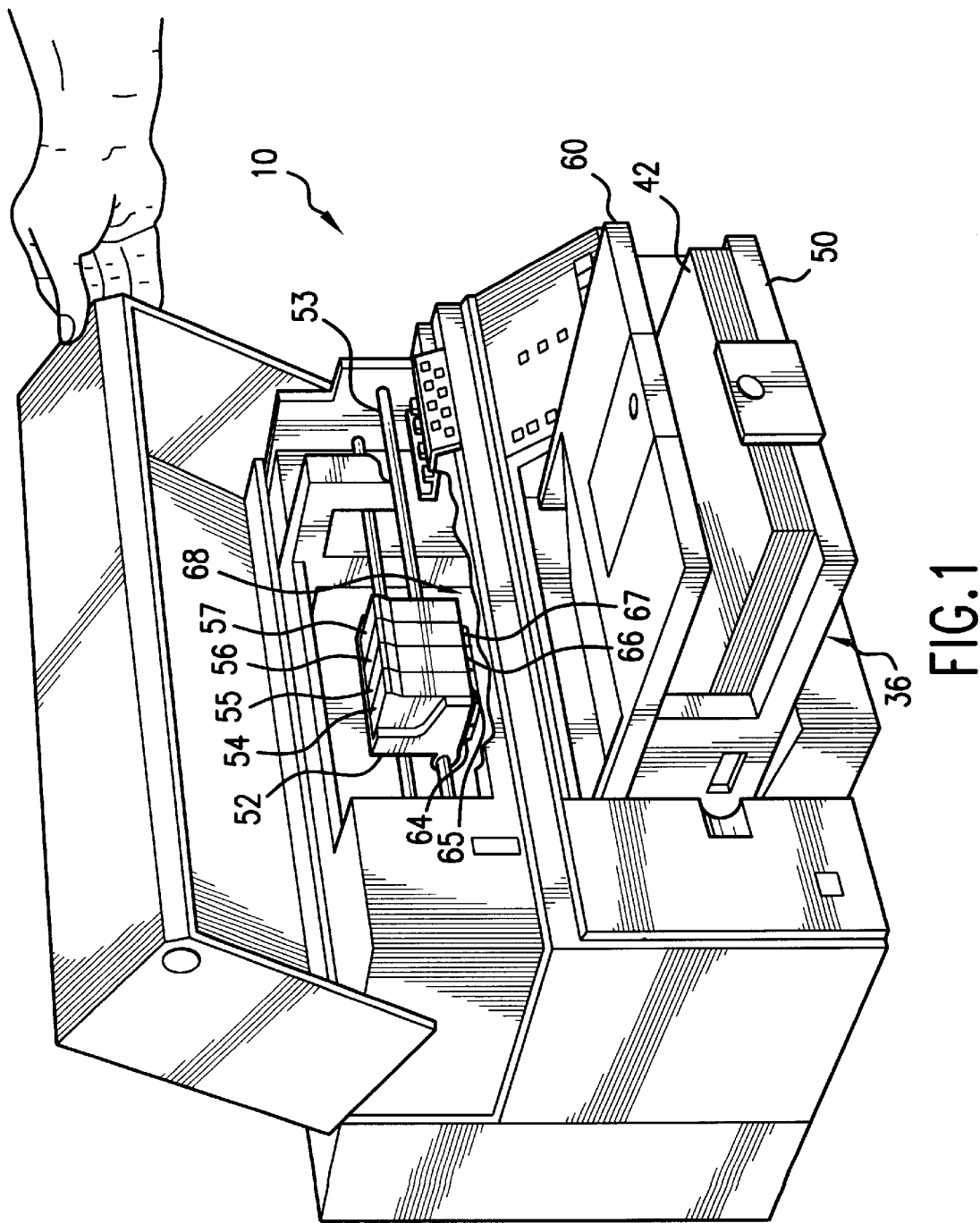
FIG. 1 is a pictorial view of an inkjet printer which is constructed in accordance with the present invention.
Figure 2:
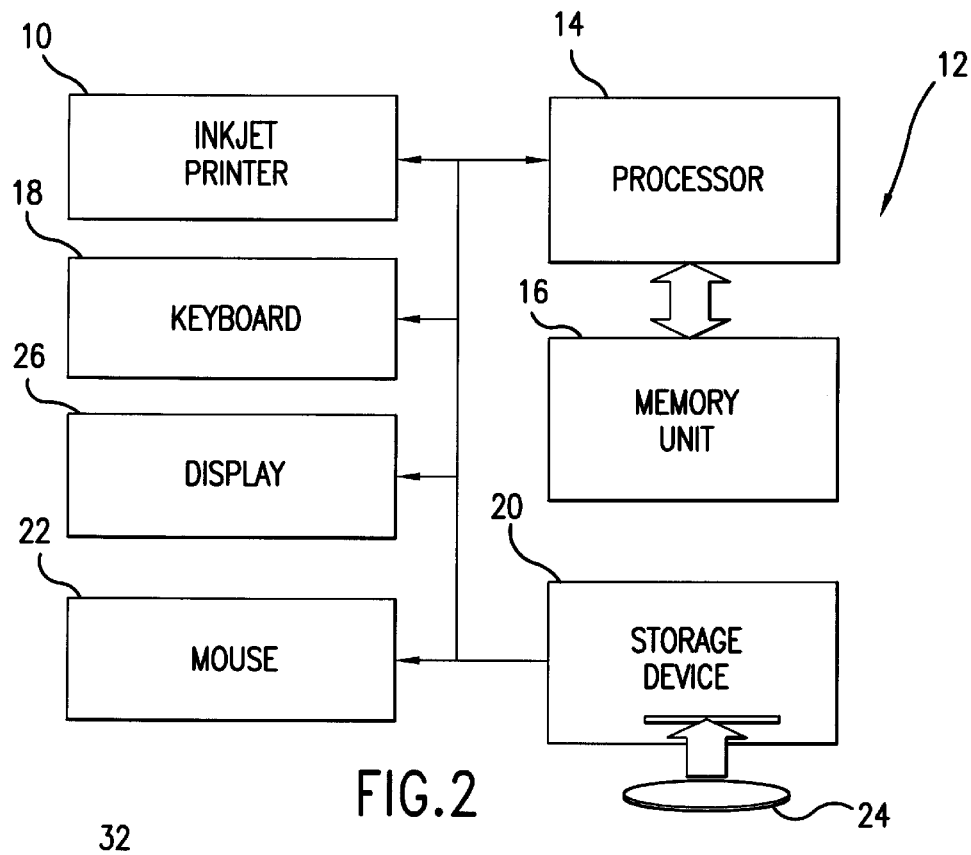
FIG. 2 is a block diagram of the inkjet printer of FIG. 1, illustrating the printer coupled to a personal computer system.
Figure 3:
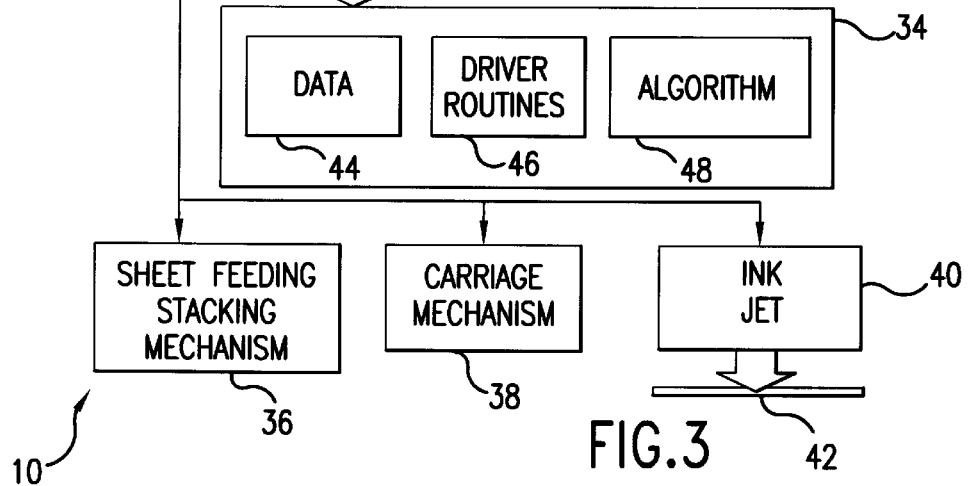
FIG. 3 is a block diagram of the hardware components of the inkjet printer of FIG. 1.

According to a third embodiment of the present invention, as best seen in FIGS. 1–3, there is shown the multi-pass computer printer 10 that is constructed in accordance with the present invention. The printer 10 illustrated in FIGS. 1 and 2, is an inkjet printer which functions as a system component in a personal computer system 12. A unique characteristic of the printer 10 is the functional ability to generate and apply a plurality of randomly generated mask to image data to be printed.

The printer 10 when coupled to the computer system 12, responds to print commands sent from a central processing unit 14 to print full color as well as black and white print images. The printed images are stored in the form of objects or textual information in a memory unit 16 that is associated with the central processing unit 14. Alternatively, the print images may be stored on a storage media 24, such as a removable compact disc, that is received within a storage device 20 coupled to the central processing unit 14.

To facilitate a user friendly interface for interactive operations, the computer system 12 also includes a plurality of computer peripheral devices. The computer peripheral devices include a display monitor 26 to enable a user to visualize the objects or textual information to be printed; a computer keyboard 18 that enables the user to enter information for command or information storage purposes; and a computer mouse 22 that facilitates input and output operations.

Considering now the printer 10 in greater detail with reference to FIGS. 1 and 3, the printer 10 generally includes a controller 32 that is coupled to the computer system 12 via an interface unit 30. The interface unit 30 facilitates the transferring of data and command signals from the processor 14 to the controller 32 for printing purposes. As best seen in FIG. 3, the interface unit 30 also enables the printer 10 to be coupled electrically to an input device 28 for the purpose of downloading print image information to be printed on a print medium 42, such as illustrated in FIG. 3. It should be understood by those skilled in the art that the input device 28 can be any type peripheral device that can be coupled directly to the printer 10, such as for example, a digital camera, a document scanner or a compact disk drive unit.

In order to store the data received from the processor 14, storage disc 24 and camera 28, the printer 10 further includes a memory unit 34. The memory unit 34 is divided into a plurality of storage areas that facilitate printer operations. The storage areas include a data storage area 44 for the information received from the processor 14 and the camera 28, a control subroutine storage area 46 that holds the algorithms that facilitate the mechanical control implementation of the various mechanical mechanisms of the printer 10; and a mask algorithm storage area 48 that retains the control algorithm 100 and mask generation subroutine 400 that will be described hereinafter in greater detail.

The data storage area 44 as previously noted, receives the data profile files that define the individual pixel values that are to be printed to form a desired object or textual image on the medium 42. The driver area 46 contains the routines that control 1)a sheet feeding stacking mechanism 36 for moving the medium 42 through the printer from a supply or feed tray 50 to an output tray 60; and 2) a carriage mechanism 38 that causes a print head carriage unit 52 to be moved across the print medium 42 on a guide rod 53.

As best seen in FIG. 1, the print head carriage unit 52 holds a set of ink cartridges 54–57 that incorporate a black ink print head 64, and a set of color ink print heads 65–67 for the colors of cyan, magenta, and yellow respectively. Each of the print heads 64–67 include a plurality of inkjet nozzles, such as a nozzle 40 (FIG. 3) for ejecting the ink droplets that form the textual and object images in a given page of information.

In operation, the high speed inkjet printer 10 responds to commands from the central processing unit 14 by printing full color or black print images on the print medium 42 which is mechanically retrieved from the feed tray 50. The feed tray 50 holds a given amount of the printing medium that varies between a single sheet, such as the sheet 42, to a predetermined maximum quantity.

The printer 10 operates in a multi-pass print mode to cause one or more swaths of ink droplets to be ejected onto the printing medium 42 to form a desired image. Each swath is formed in a pattern of individual dots that are deposited at particular pixel locations in an N by M array defined for the printing medium. The pixel locations are conveniently visualized as being small indicia receiving areas grouped in a matrix array.

Figures 6A, 6B, 6C:
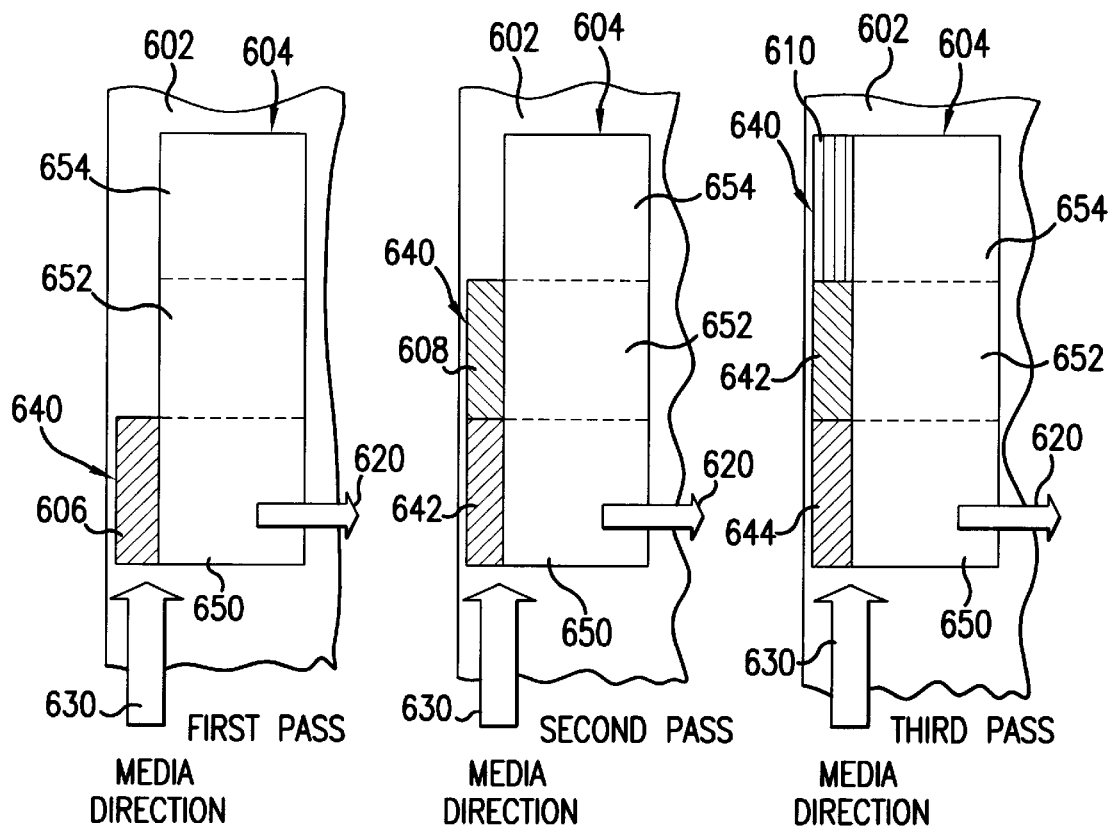
FIGS. 6A–C are diagrammatic illustrations of forming a swath of image information on a printing medium in a three pass print mode.

FIGS. 6A–6C are diagrammatic illustrations of a multipass print mode of operation, wherein a swath on a print medium 602 is defined as an indicia deposit area covered during one sweep of the inkjet print head 604. The indicia deposit area in the preferred embodiment of the present invention has a width that corresponds to the image width and a height defined by the height of the total number of nozzles in the print head 604, without loss of generality.

Thus, if a three-pass print mode is assumed as illustrated in FIGS. 6A–6C, the indicia deposit area includes an area 640, an area 642, and an area 644 that are covered with indicia forming material during one sweep of the print head 604. As will be explained hereinafter in greater detail, the indicia deposit areas 640, 642, and 644 receive indicia forming material from one or more of the three groups of print head nozzles indicated generally at 650, 652 and 654 respectively.

Referring now to the indicia deposit area 640, which is a subset of the N by M image matrix array, the illustrates of FIGS. 6A–6C are examples applicable to the complete image. Area 640 has a width that corresponds to the width M of the complete image and a height that corresponds to one-third of the height of the height dimension covered the inkjet nozzles of the print head 604. As best seen in FIG. 6A, as the print head 604 traverses above the medium 602, the print head 604 travels along a sweep path indicated generally at 620. As the print head 604 traverses along the sweep path 620 during a first pass, the nozzles in group 650 eject drops of indicia forming material onto the medium 602. The density of the ink droplets deposited on the print medium 602 in the indicia deposit area 640 during the first pass, is indicated generally at 606. When the print head 604 reaches the end of the sweep path 620, the medium 602 is advanced an incremental step along a medium path of travel indicated generally at 630. In this regard, that part of the medium corresponding to the indicia deposit area 640, is advanced to be in alignment with the inkjet nozzles in group 652 as best seen in FIG. 6B.

Referring now to FIG. 6B, as the print head 604 again traverses above the medium 602 during a second pass along the sweep path 620, the nozzles in group 652 eject drops of indicia forming material onto the medium 602 in the indicia deposit area 640. As a result of depositing additional ink droplets during the second pass, there is an increase in the density of ink droplets in the indicia deposit area 640, which is indicated generally at 608 as a darker shade. When the print head 604 reaches the end of the sweep path 620 during the second pass, the medium 604 is advanced incrementally once again so that the indicia deposit area 640 is advanced to be in alignment with the inkjet nozzles in group 654 as best seen in FIG. 6C.

Referring now to FIG. 6C, a third pass of the print head 604 along the sweep path 620 is illustrated. During the third pass, the nozzles in group 654 eject drops of indicia forming material onto the medium 602 in the indicia deposit area 640. The deposit of additional ink droplets again increases the density of the ink droplets in area 640, which is indicated generally at 610 as a still yet darker shade. From the foregoing, those skilled in the art will understand the darkest shade results from the indicia deposit area 640 receiving ink droplets during each of the three passes in the illustrative three pass print mode operation.

Referring again to FIGS. 6A–6C, it can be seen that the image information in area 640 is divided into three groups and printed over three passes by the respective ones of the inkjet nozzles 650, 652 and 654. Although the illustrative example has concentrated on the indicia deposit area 640, the other portions of the swath cover other areas similar to that area indicated at 640. These other areas, through proper media advances and inkjet nozzle ejections during sweeps of the print head 604 along the sweep path 620, are in a similar manner, covered with ink droplets during each of the three passes, except for margin areas when the print head nozzles are disposed at the top or bottom of the image, to constitute a three pass print mode of operation. More specifically, in FIGS. 6B and 6C, the area 642 receives indicia forming material from the nozzles in group 650 during a first pass and indicia forming material from the nozzles in group 652 during a second pass. In a similar manner, the area 644 receives indicia forming material from the nozzles in group 650 during the above-mentioned second pass.

Considering now the carriage unit 52 in greater detail with reference to FIG. 1, the carriage unit 52 supports and carries a set of removably mounted print cartridges, such as the print cartridges 54–57. The carriage 52 is supported from below on a slide rod 53 that permits the carriage 52 to move under the directing force of the carriage mechanism 38 along a rectilinear path of travel, such as the sweep path 620 illustrated in FIGS. 6A–C.

As best seen in FIGS. 6A–C, the path of travel followed by the print carriage 52 is traverse to the path of travel followed by the sheet 42 as it passes through a print zone, indicated generally at 68. In this regard, when a print operation is initiated by the print controller 32, in response to a print command from the processor 14, the sheet feed stacking mechanism 36 causes the sheet 42 to be moved from the supply tray 50 along a medium path of travel, such as path 630, and into the print zone 68, where the sheet 42 is stopped temporarily for printing purposes. When the sheet 42 stops along its path of travel, the carriage mechanism 38 causes the carriage 52 to scan across the sheet 42 Z number of times allowing one or more print heads, such as the print heads 64–67, to eject drops of ink via associated ones of their nozzles. The ejection of the ink droplets at appropriate times onto the medium 42 and in desired patterns is controlled by the print controller 32, wherein the timing of the application of the ink droplets onto the sheet 42 correspond to the pattern of image pixels being printed. The Z number of times the carriage 52 travels across the print medium 42 between 2 time and 16 times depending on the ink drop density deposited on the medium 42.

In one mode of operation, the controller 32 causes a stepper motor and an associated set of feed rollers (not shown) forming part of the sheet feeding stacking mechanism 36 to be actuated at the end of each pass causing the sheet 42 to be incrementally shifted or moved along its path of travel to a next printing position within the print zone 68.

When the sheet 42 comes to rest at the next position in the print zone 68, the carriage 52 is scanned across the sheet 42 for printing another portion of the image information. When the sheet 42 has been advanced through each of its printing positions in the print zone 68 so that printing of the desired information is completed, the sheet 42 is moved out from the print zone 68 into the output tray 60.

Considering now the operation of the inkjet printer 10 in greater detail with reference to FIGS. 1–3 and 4A–B, under the command of a user, the processor 14 assembles a predetermined quantity of data that is indicative of an object or document to be printed on the printing medium 42. In order to produce a hard copy of the object or document to be printed, the processor 14 sends the predetermined quantity of data to the inkjet printer 10. The inkjet printer 10 in turn, temporarily stores the data received from the processor 14 and then retrieves the data causing it to be printed or recorded on the medium 42 in the form of a plurality of ink droplets which are rapidly ejected from the print head nozzles, as the carriage 52 traverses in a reciprocating rectilinear path of travel across the medium 42.

While the controller 32 is causing the data to be printed to be temporarily stored in the data area 44 of the memory unit 34, the controller 32 is simultaneously causing a set of randomly generated print masks to be selected for application to the image information to be printed.

The algorithm 100 causes the controller 32 to apply the individual print masks in the set of Z masks to the image information to be printed. The mask application allows the image information to be separated into and then covered by Z passes, thus minimizing the printing of adjacent pixels and effectively reducing the visible effects of poor nozzle performance. A well designed set of masks thus facilitates printing in a multi-pass mode and significantly reduces artifacts.

As best seen in FIGS. 6A–6C, the resulting three pass print mode swath is formed by the ejection of ink droplets from the three respective groups of nozzles 650, 652, and 654 of the print head 604. The area indicated by 640, over the three passes, is covered by each of the three groups of nozzles 650, 652 and 654 successively. The image information deposited in area 640 is separated into passes to minimize artifacts and to complete the total image information in area 640. A first print mask is applied to the image data in area 640 and the resulting information is printed by nozzle group 650 as illustrated in FIG. 6A. After the medium advances, a second mask, that corresponds to the first is applied to the image information in area 640, and the result is printed by the nozzle group 652. After a third advance of the medium 602, and application of a third mask, the information is printed by the nozzle group 654. In this manner, the image information in area 640 is divided by the set of three masks and completely printed in the three passes. For those skilled in the art, it should be clear that the nozzles groups 652 and 654 in FIG. 6A, are ejecting ink droplets relative to second and third passes over other areas similar to area 640, respectively. Similar situations occur relative to FIGS. 6B and 6C.

Although each indicia receiving area, such as area 640, is governed by one set of masks within a group of Z, it is important that the pattern within each mask in the set does not repeat small ordered patterns, such as occurs when small 2×2 or 4×4 mask matrix arrays are applied. It is also effective in reducing patterns, that adjacent areas relative to the area 640 do not use the exact same masks for their indicia receiving areas. It is also beneficial, that in a set of masks, that each mask matrix array be structured in a large matrix array that is substantially larger than a four by four mask matrix array. The most preferred mask matrix array size is defined with a height n that corresponds to the full height of the print head 604 and with a width m that corresponds to about 256 locations. Thus, for example, one preferred mask matrix array size is 600×128. A more preferred mask matrix array size is 300×64, and the most preferred mask matrix array size is 128 by 32. From the foregoing, it should be understood by those skilled in the art, that each adjacent area such as that in area 640, utilizes a portion of the large mask matrix array and thus, limits the repeating pattern over the printed image. As mentioned herein, those portions of the matrix array utilized in each mask for each pass corresponds to one another.

In the preferred embodiment of the present invention, the control algorithm 100 is stored in the memory unit 34 and applied by the controller 32 to the image information to be printed. It should be understood by those skilled in the art that the masks applied by the algorithm 100 can be created and configured with best print mode parameters by the subroutine 400 regardless of where the subroutine 400 is stored; e.g. in the controller memory unit 34, on the storage media 24 or in the computer memory unit 16. In the third embodiment described herein, the algorithm 100 and subroutine 400 are stored in the controller memory unit 34.

Figure 4A:
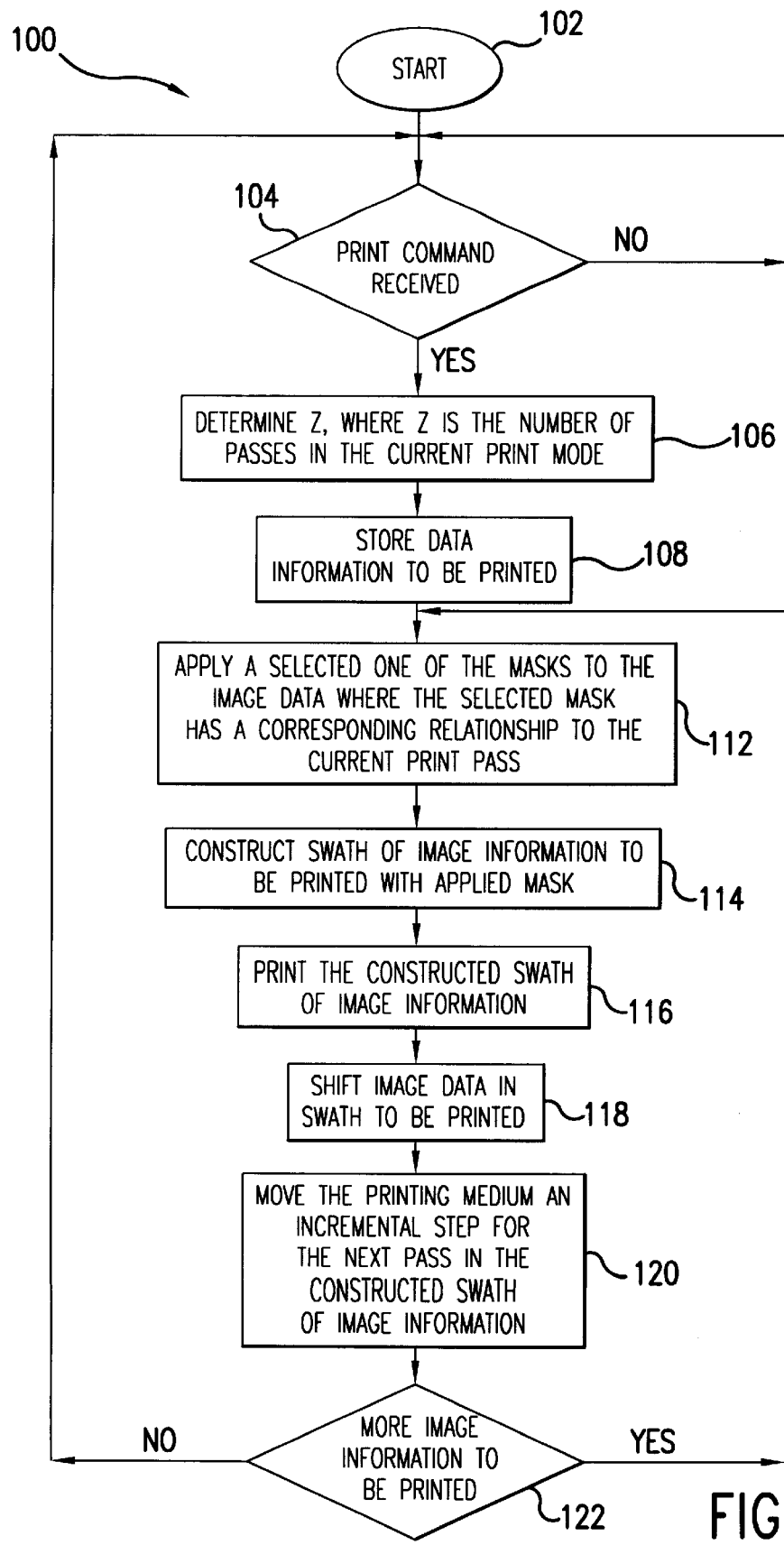
FIG. 4A is a flow chart showing the steps performed in generating a mask set having randomly determined best print mode parameters.
Figure 4B:
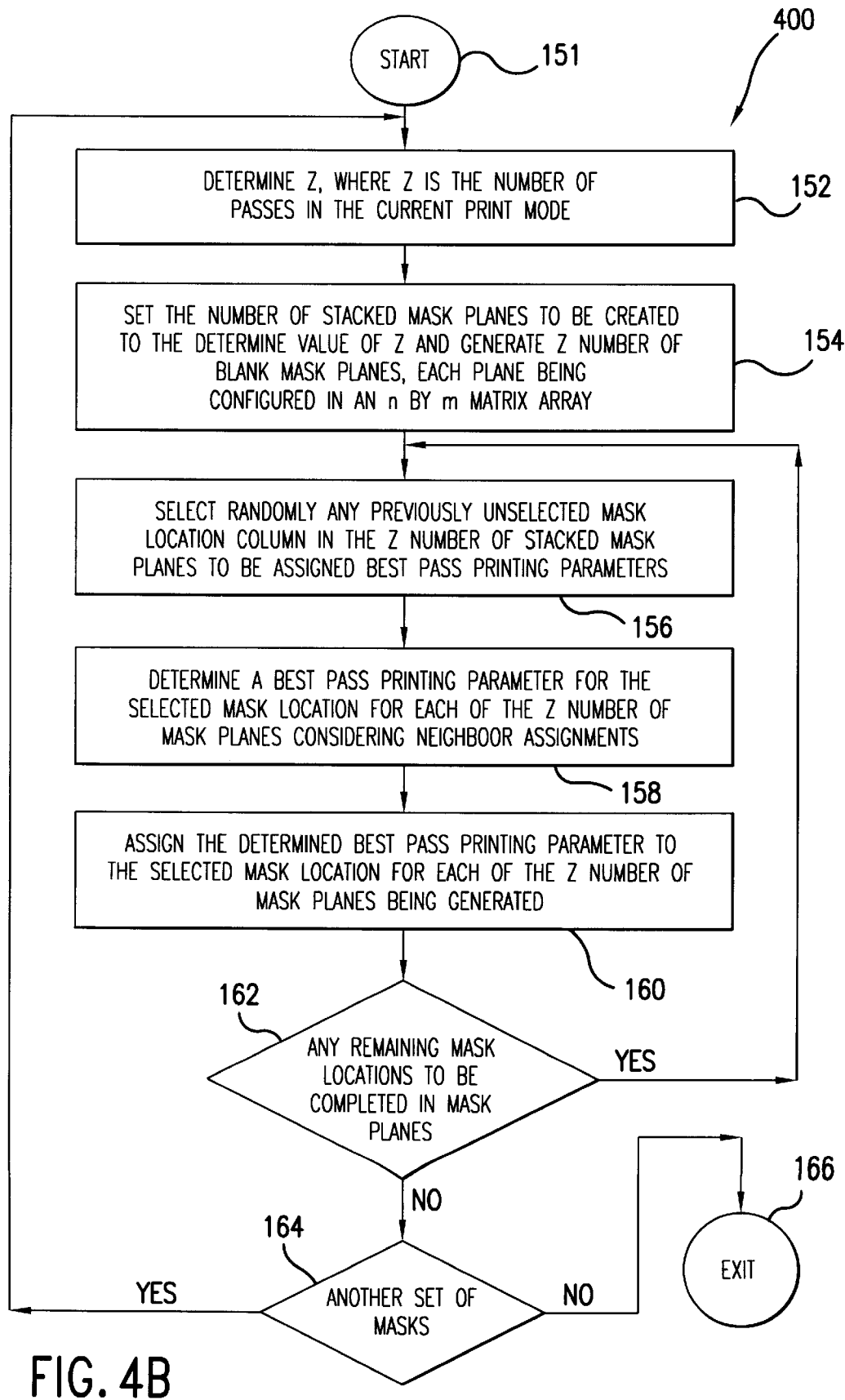
FIG. 4B is a flow chart showing the general steps performed by the printer controller of FIG. 3 in applying a randomly generated mask.

Considering now the control algorithm 100 in greater detail with reference to FIG. 4A, the number of masks that are applied via the algorithm 100, to any given area of image data is dependent upon the number of passes employed in a multi-pass print mode. For example, in a two-pass print mode, two masks are required. In a four-pass print mode, four masks are required. To generate a set of Z number of mask, the subroutine 400 considers the masks in relation to a three dimensional tower, where each of the Z masks is a plane, stacked together to form the tower. Thus, in a four-pass print mode, there are four individual planes, such as the planes 702–705 as illustrated in FIG. 7. From the foregoing, it should be understood that the same masks may be utilized for all color planes, or different generated masks for each color plane. The number of passes, Z, for printing an image is between about 2 passes and about 16 passes. A more preferred value for Z is between about 3 and about 8, while the most preferred value for Z is about 4.

Considering now the control algorithm program 100 in still greater detail with reference to FIG. 4A, the algorithm 100 begins at a start command 102 when power is applied to the controller 32. The program then proceeds to a decision command 104 to wait for a print command from the processor 14. In this regard, if no print command is received, the controller 32 loops at the decision step 104 until the print command is received.

After determining the number of passes in the current print mode, the program proceeds to a command step 108 that causes the controller 32 to store in the memory unit data area 44, the information to be printed.

Considering again the control program 100, after step 112 has been performed, the program advances to a command step 114 that causes the swath to be constructed. Next, the program proceeds to a command step 116 that causes swath of image information to be printed After the swath of image information has been printed, the program then goes to a command step 118 that causes the image data to be shifted in anticipation of printing that portion of image information to be printed during the next pass of the printing operation.

The program then advances to a command step 120 that causes the printing medium 42 to be advanced incrementally in preparation of printing the next portion of image information.

The program then proceeds to a determination step 122 to determine whether additional image information is to be printed. If additional image information is to be printed the program go to the command step 112 and proceeds as described previously. If no additional image information is to be printed the programs advances to the determination step 104 and waits for the next print command to be received.

It should be understood by those skilled in the art that a different mask is applied each time the program executes the command step 112. In this regard, each time the program executes step 112 a different one of the masks generated by the subroutine 400 is applied to the image data to be printed.

Although a different mask is applied in each pass, it should be understood by those skilled in the art, that the same mask is applied for each same numbered pass in each swath to be printed. Thus for example, in a four pass print mode, mask #1 is applied to the first pass of each four pass sequence, while mask #4 is applied to the last pass in each four pass sequence. In this manner, the same masks are uniformly applied on a swath by swath basis to the image information to be printed. The total number of masks that are applied in the formation of the desired image to be printed is determined by the total number of passes that will be made to form the image. There is no intention therefore to limit the scope of the number of masks applied to any fixed number.

Considering now the subroutine 400 in still greater detail, the subroutine 400 determines on a pixel by pixel basis the best passes to do image or textual printing utilizing a rule-base algorithm wherein each pass is scored and the pass with the highest score is selected for printing purposes as will be explained in greater detail. As best seen In FIG. 4, the subroutine 400 begins at a start step 151 whenever a set of masks needs to be generated. This can occur whenever data is to be downloaded to the printer 10, or at some other convenient time relative to the printing of data by the printer 10.

In the preferred embodiment of the present invention, the mask generation subroutine 400 is stored in the memory unit 16 associated with the processor 14. As mentioned earlier however, the storage location of the subroutine 400 may be at other locations, such as on the storage media 24 associated with the system 12 or in the memory algorithm area 48 of the printer 10.

From the start step 151, the subroutine advances to a command step 152 that determines the value of Z, where Z is the number of passes in the current print mode. The subroutine then proceeds to a command step 154.

At the command step 154, the subroutine 400 sets the number of stacked mask planes to be created to the determined value of Z and generates Z number of blank mask planes that are arranged in a stacked configuration. Each blank mask plane created in configured in an n by m matrix array as best seen in FIG. 7, where n is about 128 and m is about 32. Each mask plane is also assigned a pass number that is assigned consecutively either from the top or bottom of the stacked configuration.

After the blank mask planes are created, the subroutine go to another command step 156. In step 156, the subroutine selects randomly any previously unselected mask location column in the Z number of stacked mask planes. The selection of such a column enables the specific mask locations in the selected column to be assigned parameter values as will be described hereinafter.

After the random selection of one of the columns has been made, the subroutine advances to a command step 158 that determines a best pass printing parameter for each of the mask locations in the selected column. The printing parameter selection is utilizing a table look up procedure where the parameters are selected utilizing the parameter values found in Tables 1–3 for example.

The basic idea behind the rule-based algorithm is summarized as follows:

The focus is set on a particular mask location within the column of Z locations, in the Z number of planes that represent the Z mask in a set. A point value is then assigned to this location. The point value assigned ranges from a maximum value W+V to a minimum value of W. The maximum value is assigned when the mask locations to the left or right of the selected location are open, which means the adjacent locations have not been previously assigned a value by the subroutine 400. The minimum value is assigned when the mask locations to the left and right of the selected location are not open for L consecutive locations, where L is a value between 2 locations away and 12 locations away. A more preferred value for L is between 4 locations away and 10 locations away, while the most preferred value for L is about 6 locations away. Intermediate values are also assigned. Tables 1–3, by way of example only, indicate the various values that are assigned to the mask locations in the horizontal direction (Table 1), the vertical direction (Table 2) and the diagonal direction (Table 3) relative to open space locations.

Those skilled in the art will understand that the value assignments indicated in Tables 1–3 are examples only, and that other values are assigned depending on the number of occupied or unoccupied spaces that are available relative to a selected pixel location. Thus, with reference to Table 1 for example, if an immediately adjacent location was not open relative to the selected mask location, the parameter value assigned to the corresponding mask location would be the minimum value W.

TABLE NO. 1

X Coordinate Mask Value Assignments

| Adjacent Mask Location in X Coordinate Values | Space Open | Value Assigned |
|---|---|---|
| Immediately adjacent | Yes | W |
| One space away | Yes | W + A |
| Two spaces away | Yes | W + A + B |
| Three spaces away | Yes | W + A + B + C |
| Four spaces away | Yes | W + A + B + C + D |
| Five space away | Yes | W + A + B + C + D + E |
| Six spaces away | Yes | W + V |

Where V = A + B + C + D + E + F

TABLE NO. 2

Y Coordinate Mask Value Assignments

| Adjacent Mask Location in Y Coordinate Values | Space Open | Value Assigned |
|---|---|---|
| Immediately adjacent | Yes | W |
| One space away | Yes | W + A |
| Two spaces away | Yes | W + A + B |
| Three spaces away | Yes | W + A + B + C |
| Four spaces away | Yes | W + A + B + C + D |
| Five space away | Yes | W + A + B + C + D + E |
| Six spaces away | Yes | W + V |

Where V = A + B + C + D + E + F

TABLE NO. 3

X, Y Coordinate Mask Value Assignments

| Adjacent Mask Location in X, Y Coordinate Values | Space Open | Value Assigned |
|---|---|---|
| Immediately adjacent | Yes | W |
| One space away | Yes | W + A |
| Two spaces away | Yes | W + A + B |

TABLE NO. 3-continued

X, Y Coordinate Mask Value Assignments

| Adjacent Mask Location in X, Y Coordinate Values | Space Open | Value Assigned |
|---|---|---|
| Three spaces away | Yes | W + A + B + C |
| Four spaces away | Yes | W + A + B + C + D |
| Five space away | Yes | W + A + B + C + D + E |
| Six spaces away | Yes | W + V |
| Where V = A + B + C + D + E + F | | |

By example, if the selected mask location is the first location selected, all other locations in the matrix array would be considered empty as no values would have been assigned. Accordingly there would be no adjacent values relative to the selected location. In this regard, the selected location would be assigned the highest parameter values for horizontal, vertical and diagonal determinations. Should the subroutine make a next random selection by selecting the mask location to the immediate right of the previously selected location, the subroutine would determine that the mask location to the immediate left of the current location was already assigned a parameter value. Accordingly, the current location would be assigned the highest parameter values for vertical and diagonal determinations, but the next lesser value for the horizontal determination as the adjacent location is already assigned a value.

Figure 5:
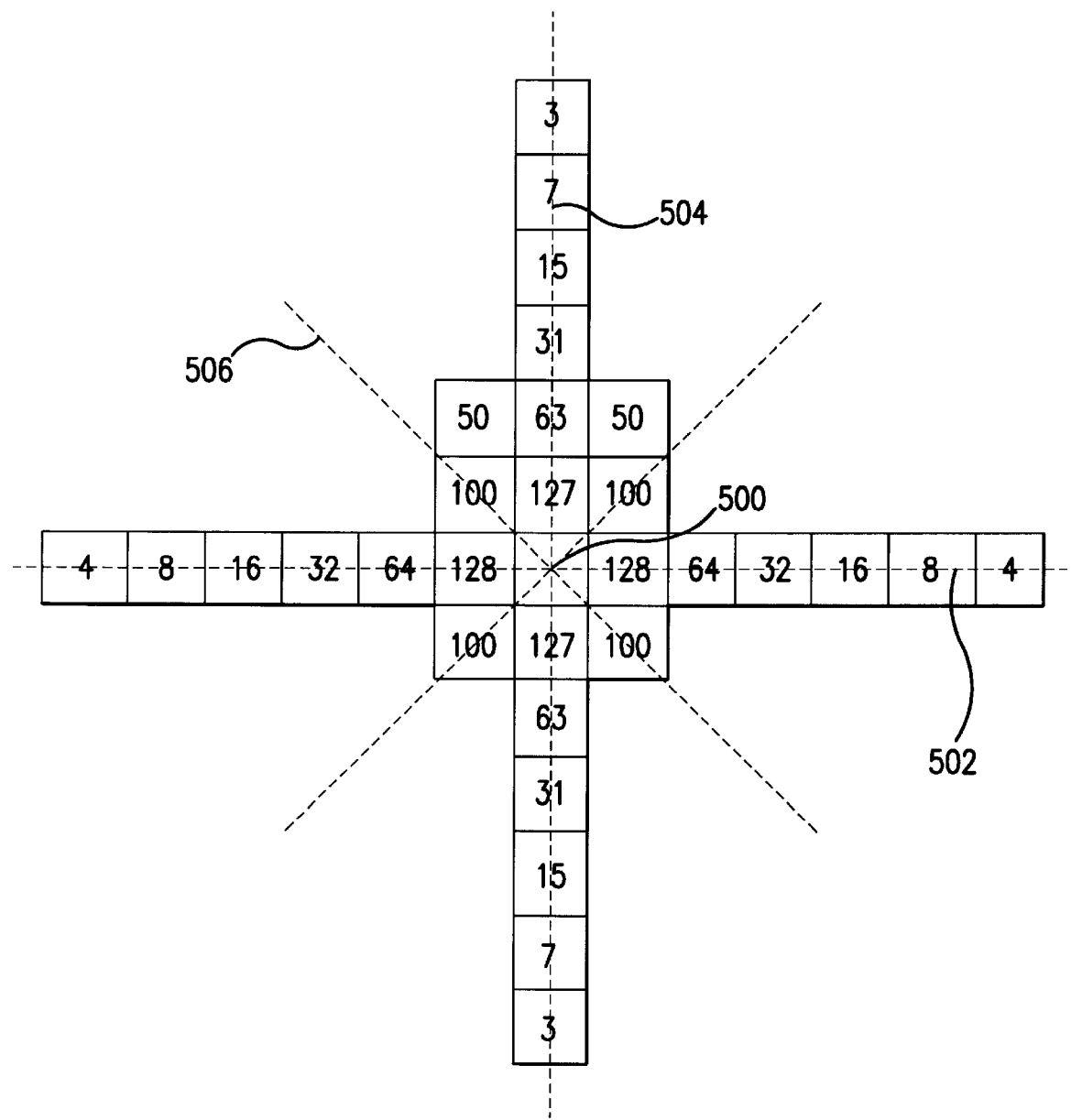
FIG. 5 is an example of neighborhood values assigned to a randomly generated mask.

To facilitate a better understanding of the assignment of best printing parameters to mask locations, an illustrative example is shown in FIG. 5.

Referring now to FIG. 5, the subroutine 400 selects a mask location, in the form of a column. In the column, each of the Z mask locations need to be assigned print parameters to constitute a best mode, in at least a locally optimal situation. For each of the Z locations in the selected column, such as a location 500, a best print mode parameter is established by examining the open locations in a two-dimensional array along a horizontal axis 502, a vertical axis 504 and a diagonal axis 506. This illustration is an example only and the values indicated for each neighborhood location does not necessarily represent an actual value used in the code.

Using the above described approach, the best parameters for all Z locations in the column are determined corresponding to one another and in reference to the neighbors of each within each plane. The subroutine 400 then proceeds from step 158 to a command step 160 that causes the selected values to be assigned to the mask locations in the selected column. The subroutine then advances to a determination step 162.

At step 162 a determination is made whether any remaining mask locations in the stacked matrix arrays need to be assigned parameter values. If additional mask locations need to be assigned parameter values the subroutine returns to step 156 and proceeds as described previously. If all of the mask locations in the stacked arrangement have been assigned parameter values, the subroutine 400 goes to another determination step 164.

A determination is made at step 164 whether another set of masks need to be generated. If no further masks are required, the subroutine proceeds to an exit step 166. If another set of masks is required, the program proceeds to step 152 and proceeds as described previously.

From the foregoing, it should be understood by those skilled in the art that randomness is effected by the rule-based sequence that selects a different individual one of the mask locations in the stack mask arrays to initiate mask building.

While a particular embodiment of the present invention has been disclosed, it is to be understood that various different modifications are possible and are contemplated within the true spirit and scope of the appended claims. For example, it is contemplated that the temporal aspects of the passes may be considered along with the immediate neighborhood of each mask location when determining the point value of a location under consideration. In this embodiment, higher points are assigned to locations that are temporally distant from a pass that prints. Thus, for example in a four-pass mode, if a first pass has already been selected to print, then the corresponding location of the third pass will be assigned more points than the corresponding locations of the second and fourth passes. The fourth pass is considered adjacent to the first pass mask because of the wrap-around property of the end masks. The points for the temporal distance are then added to the points from the neighboring mask location to obtain a grand total. As another example, it is contemplated that the best print mode parameter in any selected column are further determined based upon nozzle recovery time so that no one nozzle will be overworked during the printing process. There is no intention, therefore, of limitations to the exact abstract or disclosure herein presented.

We claim:

1. A method of mask generation, comprising:
    forming Z number of stacked n by m blank mask matrix arrays to provide a plurality of aligned columnar mask locations;
    selecting randomly any previously unselected column of mask locations from the stack of n by m blank mask matrix arrays;
    assigning best print mode parameters to the individual mask locations in the selected column of mask locations;
    repeating the steps of selecting and assigning until all columns of mask locations have been selected and all mask locations in the selected columns have been assigned best print mode parameters to provide a complete set of Z number of configured mask matrix arrays;
    wherein said step of assigning includes:
    selecting randomly any previously unselected mask location in the selected column;
    assigning a point value to the randomly selected mask location that best facilitates avoiding the depositing of indicia forming material in adjacent pixel locations during the formation of a swath of image data on a print medium;
    repeating the steps of selecting mask locations and assigning point values until all mask locations in the selected column have been assigned a point value; and
    wherein said step of assigning a point value includes assigning a higher point value to the selected mask location when its temporal distances is greatest from the other locations in the selected column previously assigned a point value.

2. A method of mask generation according to claim 1, further comprising:
    selecting any previously unassigned pass number to the selected configured mask array; and
    repeating the steps of selecting configured mask matrix arrays and assigning previously unassigned pass numbers until all the configured mask matrix arrays have been assigned a pass number.

3. A method of mask generation according to claim 2, wherein the step of assigning a previously unassigned pass number includes:

determining the value of Z, where Z is the number of passes required by a multi-pass printer to complete at least one swath of image information; and assigning one of a series of consecutive pass numbers to the selected configured mask matrix array.

4. A method of mask generation according to claim 3, wherein Z has a value of between about 2 and about 16.

5. A method of mask generation according to claim 4, wherein a more preferred value for Z is between about 3 and about 8.

6. A method of mask generation according to claim 5, wherein a most preferred value for Z is about 4.

7. A method of mask generation according to claim 1, wherein n is about the full height of the available number of nozzles in an inkjet print head and wherein m is about 256 locations.

8. A method of mask generation according to claim 7, wherein a most preferred value for n is between about 128 and about 600 and wherein a most preferred value for m is between about 28 and about 32.

9. A method of masking generation according to claim 1, further comprising:

determining during a multi-pass print mode operation a current pass number P;

selecting from a group of randomly generated configured mask matrix arrays an individual one of the configured masks having a pre-assigned pass number that corresponds in value to said current pass number P; and applying the selected randomly generated mask to image data to be printed during said current pass number P.

10. A method according to claim 9, wherein said step of selecting from a group of randomly generated configured mask matrix arrays includes:

assigning a previously unassigned pass number to the selected configured mask matrix array; and repeating the steps of selecting configured mask matrix arrays and assigning previously unassigned pass numbers until all of the configured mask matrix arrays have been assigned a pass number.

11. A method of mask generation, comprising:

forming Z number of stacked n by m blank mask matrix arrays to provide a plurality of aligned columnar mask locations;

selecting randomly any previously unselected column of mask locations from the stack of n by m blank mask matrix arrays;

assigning best print mode parameters to the individual mask locations in the selected column of mask locations;

repeating the steps of selecting and assigning until all columns of mask locations have been selected and all mask locations in the selected columns have been assigned best print mode parameters to provide a complete set of Z number of configured mask matrix arrays;

wherein said step of assigning includes:

selecting randomly any previously unselected mask location in the selected column;

assigning a point value to the randomly selected mask location that best facilitates avoiding the depositing of indicia forming material in adjacent pixel locations during the formation of a swath of image data on a print medium;

repeating the steps of selecting mask locations and assigning point values until all mask locations in the selected column have been assigned a point value; and wherein said step of assigning a point value includes assigning a maximum point value when the mask locations in the immediate neighborhood of the selected mask location have not previously been assigned a point value; and assigning a minimum point value when the mask location in the neighborhood of the selected mask location have previously been assigned a point value.

12. A method of mask generation according to claim 11, wherein said steps of assigning maximum and minimum point values includes:

determining how many L consecutive mask locations to the left and right of the selected mask location in a common horizontal plane have not previously been assigned a point value;

determining how many L consecutive mask locations to the left and right of the selected mask location in a common vertical plane have not previously been assigned a point value; and determining how many L consecutive mask locations to the left and right of the selected mask location in a both a common horizontal plane and a common vertical plane have not previously been assigned a point value.

13. A method of mask generation according to claim 12, wherein L has a value between about 1 and about 12.

14. A method of mask generation according to claim 13, wherein a more preferred value for L is between about 4 and about 10.

15. A method of mask generating according to claim 14, wherein the most preferred value for L is about 6.

16. A method of mask generation according to claim 11, further comprising:

embodying the steps of forming, selecting, assigning and repeating in computer readable code; and storing the computer readable code on a computer readable medium.

17. A printer, comprising:

a print head mechanism for depositing ink droplets onto a print medium;

a controller for causing said print head to traverse above said print medium in a rectilinear path of travel and to deposit a pattern of ink droplets onto said print medium in a plurality of swaths, where each individual swath is formed in Z different passes of said print head traversing along said rectilinear path of travel;

a mask generation subroutine for generating randomly Z different masks for each swath to be printed to substantially eliminate artifacts in said pattern of ink droplets deposited on said print medium; and a control program responsive to said mask generation subroutine for causing said controller to apply for each swath to be printed a selected individual ones of said Z different masks to control the pattern of ink droplets so that the depositing of adjacent ink droplets in each individual swath are spaced to occur in different ones of the Z passes;

wherein each mask location is assigned a unique best printing value based upon the previously assigned best printing values associated with each mask location immediately adjacent thereto in the horizontal, vertical and diagonal directions.

18. A printer according to claim 17, further comprising:
a memory unit for storing said mask generation subroutine and said control program.

19. A printer according to claim 17,
said mask generation subroutine generates randomly a best pass printing parameter for each mask location in the Z number of different masks.

20. A printer according to claim 17, wherein the different best pass printing parameters assigned for each mask location facilitates substantially eliminating the depositing of indicia forming material in adjacent pixel locations during the same pass.

21. A printer according to claim 20, wherein the mask generation subroutine is a rules based algorithm to determine the best ones of the Z number of passes in which to deposit the indicia forming material to substantially avoid deposits in adjacent pixel locations during the same pass.

22. A printer according to claim 17, wherein the indicia forming material is ink droplets; and wherein
the mask generation subroutine determines the best printing patterns to substantially avoid placing ink droplets adjacent to one another horizontally on a printing medium.

23. A printer according to claim 22, wherein the mask generation subroutine further determines the best printing patterns to substantially avoid placing ink droplets adjacent to one another vertically on said printing medium.

24. A printer according to claim 23, wherein the mask generation subroutine further determines the best printing patterns to substantially avoid placing ink droplets adjacent to one another diagonally on said printing medium.

25. A printer according to claim 17, further comprising:
means for storing a predetermined quantity of data indicative of an image to be printed on the medium in a matrix array of N by M pixel locations;
mask matrix generating means for forming Z number of stacked n by m blank mask matrix arrays to provide a plurality of aligned columnar mask locations;
randomizing means for selecting randomly any previously unselected column of mask locations from the stack of n by m blank mask matrix arrays;
determination means for assigning best print mode parameters to the individual mask locations in the selected column of mask locations; and
memory means for storing a complete set of Z number of configured mask matrix arrays after all columns of mask locations have been selected and all mask locations in the selected columns have been assigned best print mode parameters.

26. A printer according to claim 25, wherein said memory means is a memory unit.

27. A printer according to claim 25, wherein said determination means is a mask generation program.

28. A printer, comprising:
a print head mechanism for depositing ink droplets onto a print medium;
a controller for causing said print head to traverse above said print medium in a rectilinear path of travel and to deposit a pattern of ink droplets onto said print medium in a plurality of swaths, where each individual swath is formed in Z different passes of said print head traversing along said rectilinear path of travel;
a mask generation subroutine for generating randomly Z different masks for each swath to be printed to substantially eliminate artifacts in said pattern of ink droplets deposited on said print medium;
a control program responsive to said mask generation subroutine for causing said controller to apply for each swath to be printed a selected individual ones of said Z different masks to control the pattern of ink droplets so that the depositing of adjacent ink droplets in each individual swath are spaced to occur in different ones of the Z passes;
wherein the indicia forming material is ink droplets;
wherein the mask generation subroutine further determines the best printing patterns to substantially avoid placing ink droplets adjacent to one another horizontally on a printing medium;
wherein the mask generation subroutine further determines the best printing patterns to substantially avoid placing ink droplets adjacent to one another diagonally on said printing medium;
wherein the mask generation subroutine determines the best printing patterns so the left most location in a given mask will have the rightmost elements as its left neighbors.

29. A method of mask generation, comprising:
forming Z number of stacked n by m blank mask matrix arrays to provide a plurality of aligned columnar mask locations;
selecting randomly any previously unselected column of mask locations from a stack of n by m blank mask matrix arrays;
selecting randomly any previously unselected mask location in the selected column;
assigning a point value to the randomly selected mask location that best facilitates avoiding the depositing of indicia forming material in adjacent pixel locations during the formation of a swath of image data on a print medium;
repeating the steps of selecting mask locations and assigning point values until all mask locations in the selected column have been assigned a point value;
repeating the steps of selecting, selecting, assigning and repeating until all columns of mask locations have been selected and all mask locations in the selected columns have been assigned best print mode parameters to provide a complete set of Z number of configured mask matrix arrays;
wherein said step of assigning a point values includes:
assigning a maximum point value when the mask locations in the immediate neighborhood of the selected mask location have not previously been assigned a point value; and
assigning a minimum point value when the mask locations in the neighborhood of the selected mask location have previously been assigned a point value.

30. A method of mask generation according to claim 29, wherein said steps of assigning maximum and minimum point values includes:
determining how many L consecutive mask locations to the left and right of the selected mask location in a common horizontal plane have not previously been assigned a point value;
determining how many L consecutive mask locations to the left and right of the selected mask location in a common vertical plane have not previously been assigned a point value; and determining how many L consecutive mask locations to the left and right of the selected mask location in a both a common horizontal plane and a common vertical plane have not previously been assigned a point value.

31. A method of mask generation, comprising:

forming Z number of stacked n by m blank mask matrix arrays to provide a plurality of aligned columnar mask locations;

selecting randomly any previously unselected column of mask locations from the stack of n by m blank mask matrix arrays;

selecting randomly any previously unselected mask location in the selected column;

determining how many L consecutive mask locations to the left and right of the selected mask location in a common horizontal plane have not previously been assigned a point value;

determining how many L consecutive mask locations to the left and right of the selected mask location in a common vertical plane have not previously been assigned a point value; and determining how many L consecutive mask locations to the left and right of the selected mask location in a both a common horizontal plane and a common vertical plane have not previously been assigned a point value;

assigning a maximum point value when the mask locations in the immediate neighborhood of the selected mask location have not previously been assigned a point value;

assigning a minimum point value when the mask locations in the neighborhood of the selected mask location have previously been assigned a point value;

said steps of assigning point values facilitating the avoiding of depositing indicia forming material in adjacent pixel locations on a print medium during the formation of a swath of image data;

repeating the steps of selecting mask locations and assigning point values until all mask locations in the selected column have been assigned a point value;

repeating the steps of selecting, selecting, assigning and repeating until all columns of mask locations have been selected and all mask locations in the selected columns have been assigned best print mode parameters to provide a complete set of Z number of configured mask matrix arrays.

32. A method of mask generation, comprising:

determining how many L consecutive mask locations to the left and right of a selected mask location in a common horizontal, vertical plane, or in both a common horizontal or vertical plane have been assigned a point value;

assigning a maximum point value when the mask locations in an immediate neighborhood of the selected mask location have not previously been assigned a point value; and assigning a minimum point value when the mask locations have been assigned a point value.

* * * * *